US010620365B2

(12) United States Patent
Dawson

(10) Patent No.: US 10,620,365 B2
(45) Date of Patent: Apr. 14, 2020

(54) OVERLAY PANEL WITH LIGHT GUIDES FOR A DISPLAY DEVICE

(71) Applicant: SONY CORPORATION, Tokyo (JP)

(72) Inventor: Thomas Dawson, San Diego, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/012,314

(22) Filed: Jun. 19, 2018

(65) Prior Publication Data
US 2019/0383983 A1    Dec. 19, 2019

(51) Int. Cl.
*G02B 6/08* (2006.01)
*F21V 8/00* (2006.01)
*H05K 5/00* (2006.01)

(52) U.S. Cl.
CPC ............ *G02B 6/008* (2013.01); *G02B 6/0005* (2013.01); *G02B 6/0088* (2013.01); *G02B 6/08* (2013.01); *H05K 5/0017* (2013.01)

(58) Field of Classification Search
CPC ........ G02B 6/08; G02B 6/0088; G02B 6/008; G02B 6/0005
USPC ......................................................... 362/559
See application file for complete search history.

(56) References Cited

U.S. PATENT DOCUMENTS

| | | | |
|---|---|---|---|
| 7,145,611 B2 | 12/2006 | Dubin et al. | |
| 9,274,369 B1* | 3/2016 | Lee | G02F 1/133524 |
| 2005/0243415 A1* | 11/2005 | Lowe | G02B 6/0021 |
| | | | 359/443 |
| 2011/0025594 A1* | 2/2011 | Watanabe | G02F 1/13336 |
| | | | 345/102 |
| 2014/0037257 A1* | 2/2014 | Yang | G02B 6/0078 |
| | | | 385/116 |
| 2014/0218961 A1* | 8/2014 | Wu | G02B 6/08 |
| | | | 362/559 |
| 2014/0355227 A1* | 12/2014 | Lim | H05K 1/028 |
| | | | 361/749 |
| 2015/0092395 A1* | 4/2015 | Wu | G02B 6/0051 |
| | | | 362/97.1 |
| 2015/0277173 A1 | 10/2015 | Jung et al. | |
| 2017/0094814 A1* | 3/2017 | Chin | G02B 6/08 |
| 2017/0094815 A1* | 3/2017 | Chin | H05K 5/0017 |
| 2018/0128973 A1* | 5/2018 | Powell | G02B 6/06 |

OTHER PUBLICATIONS

Ebert, et al., "Tiled++: An Enhanced Tiled Hi-Res Display Wall", IEEE Transactions on Visualization and Computer Graphics, vol. 16, Issue 1, May 26, 2009, pp. 120-132.

* cited by examiner

*Primary Examiner* — Christopher M Raabe
(74) *Attorney, Agent, or Firm* — Chip Law Group

(57) ABSTRACT

An overlay panel that includes a front display portion arranged over surface area of a display device. The overlay panel further includes a guiding portion that comprises light guides arranged in a specific pattern. The light guides are arranged such that an input portion of each light guide is aligned with pixels or sub-pixels of the display device and an output portion of each light guide is coupled to the front display portion. The arrangement of each light guide transfers an excitation, caused by the set of pixels or sub-pixels, from the input portion to the output portion and causes the front display portion to display an image that covers a bezel portion and the display portion of the display device. Each pixel in the image is scaled by an equal scaling factor with respect to each pixel in display portion.

27 Claims, 12 Drawing Sheets

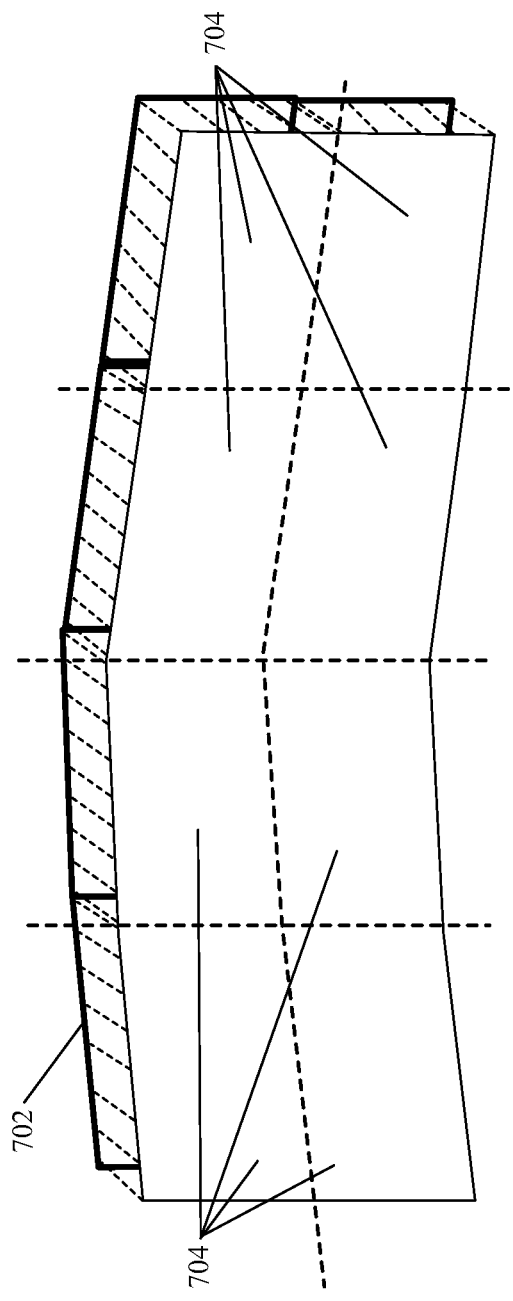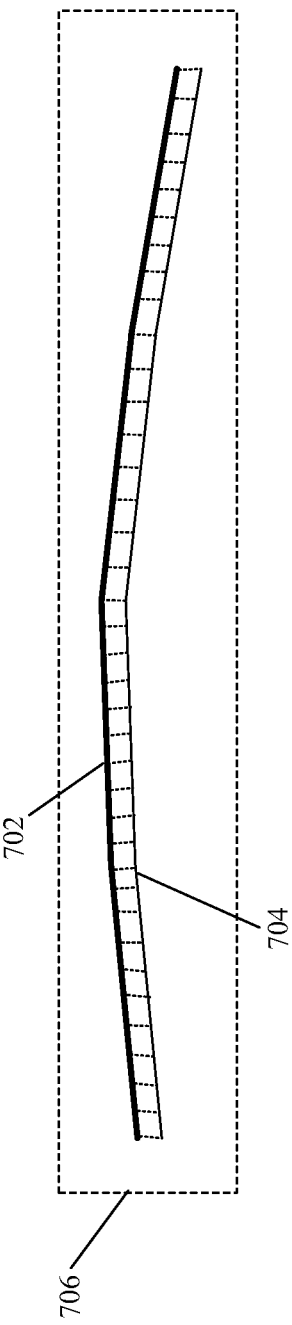
FIG. 7A
FIG. 7B

OVERLAY PANEL WITH LIGHT GUIDES FOR A DISPLAY DEVICE

CROSS-REFERENCE TO RELATED APPLICATIONS/INCORPORATION BY REFERENCE

None.

FIELD

Various embodiments of the disclosure relate to display enhancement technologies. More specifically, various embodiments of the disclosure relate to an overlay panel with light guides for a display device.

BACKGROUND

Recent advancements in the field of display technologies have led to the development of various display systems or devices. Typically, a display device, such as a television, includes a display screen surrounded by bezels at edges of the display screen. Images or video on such display devices is viewable by a viewer only on the area of the display screen excluding the bezels at edges. In certain scenarios, a large display may be created by using multiple display panels that may be arranged side by side, to display an image or a video. However, the bezel portions along the edges of each display panels creates a noticeable artifact in the overall display, which may not be visually pleasing. Various attempts have been made to conceal the bezel portions. In one such attempt, the bezel portions are covered with overlay strips that use Fresnel lenses to extend images on top of the bezel portions. However, certain faded seams at the bezel portions may still be visually perceptible. Further, the viewing experience of all audience viewing such multi-panel or single panel display screen may not be the same from different viewpoints. A user sitting at a certain view position, for example, an extreme corner section with reference to the multi-panel or single panel display screen, may not have the same viewing experience as compared to a user sitting at other view position, for example, a mid-section in front of the multi-panel or single panel display screen. Such conventional display systems not only compromise the user experience, but also causes physical or eye strain to the users while viewing the image or the video. Therefore, an improved display system may be desirable to provide enhanced viewing experience and increase user engagement.

Further limitations and disadvantages of conventional and traditional approaches will become apparent to one skill in the art, through comparison of described systems with some aspects of the present disclosure, as set forth in the remainder of the present application and with reference to the drawings.

SUMMARY

An overlay panel with light guides for a display device is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

FIG. 7A illustrates a second exemplary multi-panel display device, in accordance with an embodiment of the disclosure.

FIG. 7B illustrates a top view of the multi-panel display device of FIG. 7A arranged in a curved pattern, in accordance with an embodiment of the disclosure.

DETAILED DESCRIPTION

The following described implementations may be found in the disclosed overlay panel with light guides for a display device. Exemplary aspects of the disclosure provides an overlay panel for a display device. The overlay panel may include a front display portion and a guiding portion. The overlay panel may be arranged over a surface area of the display device. The guiding portion of the overlay panel may comprise a plurality of light guides arranged in a specific pattern which covers the surface area of a display portion of the display device and a bezel portion along the edges of the display device.

In contrast to conventional systems, when media content (for example, images, or video, or other content) is displayed on the display portion of display device, the disclosed overlay panel extends (or enlarges) the displayed media content to cover up the bezel portion along the edges of the display device, such as a television. Although the displayed media content is extended or enlarged to cover up the bezel portion, the arrangement of the plurality of light guides in the specific pattern in the disclosed overlay panel ensures a seamless, distortion-free, and other artifact-free viewing experience for all audience viewing such display device with the overlay panel from different viewpoints. Alternatively stated, the display of the media content on the front display portion of the overlay panel may be scaled such that the audience may be able to see the actual and accurate media content from a plurality of viewing angles. Further, the overlay panel may be utilized in scenarios where multi-panel display screens are used. A seamless video wall may be constructed as the bezel portion are concealed when the overlay panel is overlaid on the viewable side of the multi-panel display screens. Thus, multi-panel display screens may appear as a single large screen to a viewer.

Figure 1A:
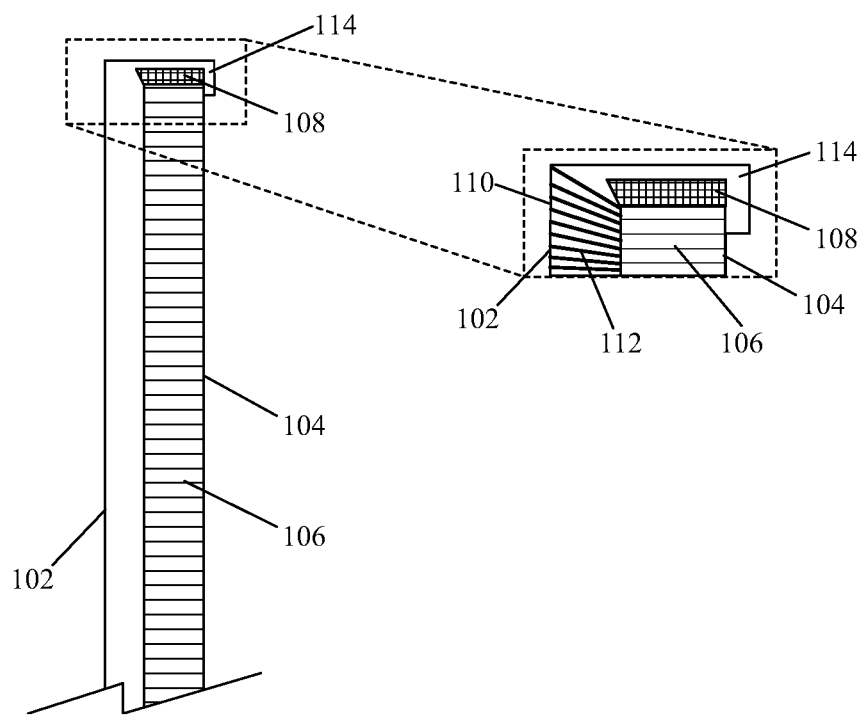
FIG. 1A illustrates a side cutaway view of an overlay panel arranged on a display device, in accordance with an embodiment of the disclosure.

FIG. 1A illustrates a side cutaway view of an overlay panel arranged on a display device, in accordance with an embodiment of the disclosure. With reference to FIG. 1A, there is shown an overlay panel 102, a display device 104, a display portion 106 of the display device 104, and a bezel portion 108 of the display device 104. There is further shown a magnified side cutaway view that includes a front display portion 110 of the overlay panel 102, a guiding portion 112 of the overlay panel 102, and a plurality of side clips 114.

In accordance with an embodiment, the overlay panel 102 may be a flat or a curved panel laid over a display device, such as the display device 104. The display device 104 may be may be realized through several known technologies, examples of which may include, but not limited to at least one of a Liquid Crystal Display (LCD) display, a Light Emitting Diode (LED) display, a plasma display, or an Organic LED (OLED) display, or other display devices. In some embodiments, the display device 104 may be a television (TV). The overlay panel 102 may be made of a plurality of different materials or a single material throughout that may exhibit uniform properties that include, but are not limited to, thermal stability, minimum diffusion of light, optical clarity, rigidity, dimensional stability, and the like. Examples of material of the overlay panel 102 may include but are not limited to acrylic plastic, also known as polymethyl methacrylate (PMMA), polycarbonate plastics, Silica glass, and the like.

In accordance with an embodiment, the overlay panel 102 may comprise the front display portion 110 and the guiding portion 112. The front display portion 110 may be a display that may be in a field-of-view of a user (or an audience). The user (or the audience) may view the image or a media content item, such as videos or movies on the front display portion 110 of the overlay panel 102. The overlay panel 102 may be mounted over a surface area of the display portion 106 of the display device 104 through a support portion that comprises the plurality of side clips 114. The plurality of side clips 114 may provide support to the overlay panel 102 positioned on the display device 104. The front display portion 110 may be arranged at the front of the display device 104 with respect to a view-point of the user or the audience. The front display portion 110 of the overlay panel 102 may be at least one of a transparent region, a frosted region, or a combination of the transparent region in center area of the front display portion 110 and the frosted region at edges of the front display portion 110. The front display portion 110 of the overlay panel 102 may be made up of a transparent glass or a transparent plastic material or a frosted glass or a frosted plastic material. In an alternate embodiment, frosted effect may be applied directly to an outer surface of the plurality of light guides with respect to the user's viewpoint.

In accordance with an embodiment, the guiding portion 112 of the overlay panel 102 may comprise a plurality of light guides arranged in a specific pattern between the front display portion 110 and the display portion 106 of the display device 104, as shown. The plurality of light guides may be fiber optic light guides that transmits illumination from one display screen to another display screen. The fiber optic light guides may be made of a plurality of different materials, examples of which may include, but are not limited to silica glass, fluorozirconate, fluoroaluminate, chalcogenide glasses as well as crystalline materials like sapphire, and the like. In accordance with an embodiment, the plurality of light guides may be made of plastic material, examples of which may include, but are not limited to acrylic plastic, also known PMMA, polycarbonate plastics, and the like. The specific pattern of arrangement of the plurality of light guides of the guiding portion 112 may correspond to a stacked bundle-like arrangement in at least one of a raster pattern, a hexagonal pattern, and a polygonal pattern. Alternatively stated the plurality of light guides may be stacked in a bundle in at least one of a raster pattern, a hexagonal pattern, and a polygonal pattern.

In accordance with an embodiment, the front display portion 110 of the overlay panel 102 may be arranged over a surface area (i.e., entire front surface) of the display device 104. The surface area of the display device 104 may include the display portion 106 and the bezel portion 108 of the display device 104. The display portion 106 of the display device 104 may be a display screen (excluding the bezel portion 108) of the display device 104. The display portion 106 of the display device 104 may comprise a plurality of pixels that may display any visual media content, such as images, video, movies, and the like, on the display portion 106. The bezel portion 108 of the display device 104 may be an area around the display portion 106 that may surround the display portion 106 along its edges. The bezel portion 108 may be made of a hard material, such as a hard plastic or metal. The guiding portion 112 of the overlay panel 102 that comprises the plurality of light guides, may be arranged in a specific pattern between the front display portion 110 of the overlay panel 102 and the display portion 106 (such as a display screen) of the display device 104. The plurality of light guides in the guiding portion 112 of the overlay panel 102 may be arranged in such a way that an input portion of each light guide of the plurality of light guides may be aligned with a set of pixels or sub-pixels of the plurality of pixels present in the display portion 106 of the display device 104. An output portion of each light guide may be coupled to the front display portion 110 of the overlay panel 102. In some embodiments, the plurality of light guides may be arranged between the front display portion 110 and the display portion 106 of the display device 104 in accordance with one of a conical arrangement or a truncated conical arrangement.

In accordance with an embodiment, each light guide in the guiding portion 112 may transfer excitation (such as light), caused by the set of pixels or sub-pixels, from the input portion to the output portion of each light guide at the front display portion 110. In accordance with an embodiment, the plurality of light guides may be arranged as a guide plate. The guide plate may comprise a plurality of localized guiding regions to transfer the excitations from the plurality of pixels in the display portion 106 of the display device 104 to the front display portion 110 of the overlay panel 102. The front display portion 110 of the overlay panel 102 may display the image (or any media content displayed on the display device 104) based on the excitation received. The image displayed at the front display portion 110 may cover the bezel portion 108 and the display portion 106 of the display device 104. As a result of which, the displayed image on the front display portion 110 of the overlay panel 102 may be larger than the image displayed at the display portion 106 of the display device 104. The bezel portion 108 of the display device 104 may be concealed when the image is displayed on the front display portion 110 of the overlay panel 102 providing an enhanced viewing experience.

Figure 1B:
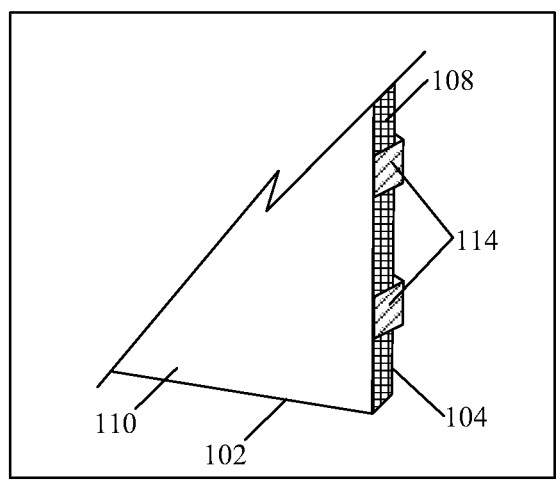
FIG. 1B illustrates a support portion of the overlay panel, in accordance with an embodiment of the disclosure.

FIG. 1B illustrates an exemplary support portion of the overlay panel, in accordance with an embodiment of the disclosure. With reference to FIG. 1B, there is shown the overlay panel 102, the front display portion 110 of the overlay panel 102, the display device 104, the bezel portion 108 of the display device 104, and the plurality of side clips 114. In accordance with an embodiment, the overlay panel 102 may be mounted on the display device 104 through a support portion. Examples of the support portion may include, but are not limited to adhesives, and mounting hardware, such as clips, fasteners, and the like. In accordance with an embodiment of the disclosure, the support portion may comprise a plurality of side clips, such as the plurality of side clips 114. The overlay panel 102 may be mounted on the surface area of the display device 104 by the plurality of side clips 114. The plurality of side clips 114 may provide support, alignment and positioning to the overlay panel 102 laid over the display device 104. The plurality of side clips 114 may extend out only till the edges of the overlay panel 102. The plurality of side clips 114 may help to hold the overlay panel 102 to be detachably laid over the display device 104. The side clips 114 may be made of a hard material or a combination of materials, such as plastic, metal and the like.

Figure 1C:
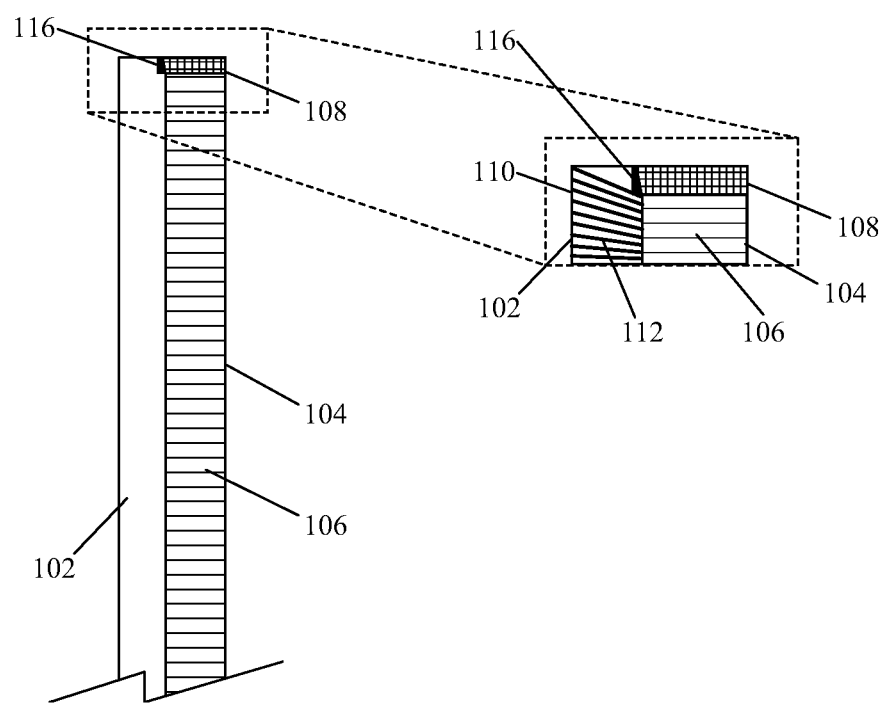
FIG. 1C illustrates an application of an adhesive material for mounting the overlay panel on the display device, in accordance with an embodiment of the disclosure.

FIG. 1C illustrates an application of an adhesive material for mounting the overlay panel on the display device, in accordance with an embodiment of the disclosure. With reference to FIG. 1C, there is shown the overlay panel 102, the display device 104, the display portion of the display device 104, and the bezel portion 108 of the display device 104. There is further shown a magnified side cutaway view that includes the front display portion 110 of the overlay panel 102, the guiding portion 112 of the overlay panel 102, and an adhesive material 116. In accordance with an embodiment, the overlay panel 102 may be mounted on the surface area of the display device 104 based on an application of the adhesive material 116 on a contact region between the display device 104 and the overlay panel 102. The contact region between the display device 104 and the overlay panel 102 may be at the bezel portion 108 of the display device. Examples of the adhesive material 116 may include, but are not limited to, epoxies, cyanoacrylates, certain urethanes, or acrylic adhesives. The adhesive material 116 applied on the contact region between the display device 104 and the overlay panel 102 may support, alignment and positioning to the overlay panel 102 positioned on the display device 104. The adhesive material 116 may provide an edge-to-edge support to the overlay panel 102 that is mounted on the display device 104. In accordance with an embodiment, the overlay panel 102 may be mounted on the surface area of the display device 104 by a combination of the plurality of side clips 114 (as shown in FIGS. 1A and 1B) and the adhesive material 116. For example, in a certain scenario, the plurality of side clips 114 (as shown in FIGS. 1A and 1B) may be utilized to mount the overlay panel 102 to the display device 104 with the application of the adhesive material 116 on a contact region between the plurality of side clips 114 and the display device 104.

Figure 2A:
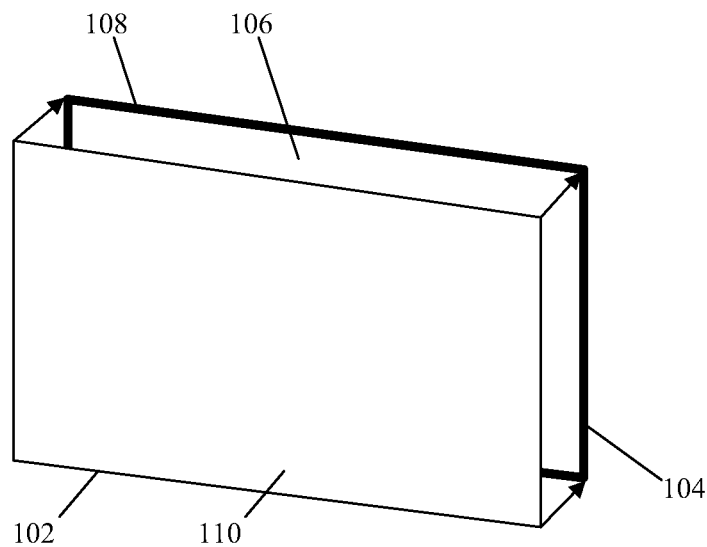
FIG. 2A illustrates an arrangement of the overlay panel on the display device, in accordance with an embodiment of the disclosure.

FIG. 2A illustrates an exemplary arrangement of the overlay panel on the display device, in accordance with an embodiment of the disclosure. With reference to FIG. 2, there is shown the overlay panel 102, the display device 104, and the display portion 106 of the display device 104, the bezel portion 108 of the display device 104, and the front display portion of the overlay panel 102. In accordance with an embodiment, the overlay panel 102, which comprises the front display portion 110 and the guiding portion 112, may be arranged over the surface area (i.e., display side) of the display device 104. The overlay panel 102 may be arranged such that it covers the entire surface area of the display device 104, including the display portion 106 of the display device and the bezel portion 108 of the display device 104.

The front display portion 110 of the overlay panel 102 may display the image displayed on the display portion 106 of the display device 104 based on the excitation (such as light) transferred by the plurality of light guides of the guiding portion 112. The image may be displayed on the front display portion 110 such that each pixel in the image may be scaled by an equal scaling factor with respect to each pixel in display portion 106 of the display device 104. Each pixel of the image displayed on the front display portion 110 is scaled by an equal scaling factor to fit the image (previously displayed on the display portion 106), to be displayed on the front display portion 110 of the overlay panel 102. The equal scaling factor results in resizing of the image displayed on the display portion 106 of the display device 104, so as to enable display of the resized image on the front display portion 110 of the overlay panel 102. Equal scaling factor may be applied to all the pixels of the image, such that the image displayed on the front display portion 110 may be distortion less. In accordance with an embodiment, length of the bezel portion 108 of the display device 104 may be extended above a plane of the display portion 106 of the display device 104. Alternatively stated, a size or length of the bezel portion 108 of the display device 104 may be thicker or thinner in different display devices. Thus, the guiding portion 112 may have a thickness, based on the extended length of the bezel portion 108 above the plane of the display portion 106 of the display device 104. Further, a value of the equal scaling factor may depend on the guiding portion thickness.

Figure 2B:
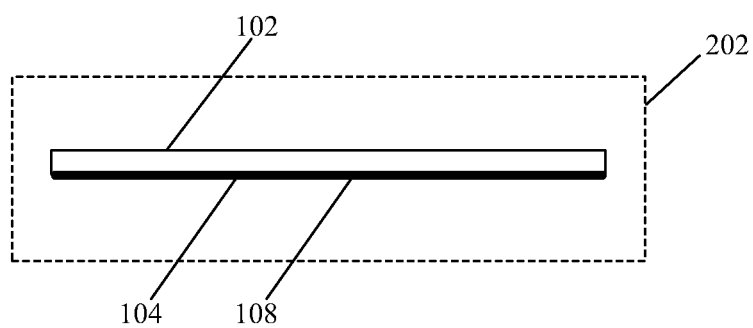
FIG. 2B illustrates a top view of the arrangement of the overlay panel on the display device of FIG. 2A, in accordance with an embodiment of the disclosure.

FIG. 2B illustrates a top view of the arrangement of the overlay panel on the display device of FIG. 2A, in accordance with an embodiment of the disclosure. With reference to FIG. 2B, there is shown a top view 202 of the arrangement of the overlay panel 102 on the display device 104. In accordance with an embodiment, the overlay panel 102 may be mounted on the display device 104 such that it covers the entire surface area of the display device 104, including the display portion 106 of the display device and the bezel portion 108 of the display device 104. The top view 202 of the arrangement of the overlay panel 102, as shown in FIG. 2B, illustrates, the overlay panel 102, which is sized large enough to cover the bezel portion 108 and the display portion 106 of the display device 104. In other words, the overlay panel 102 may cover the display device 104 from end to end including the bezel portion 108 of the display device 104.

Figure 3A:
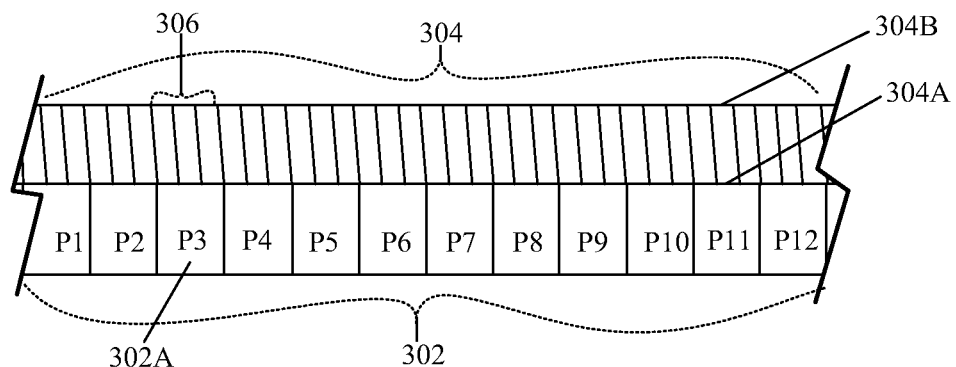
FIG. 3A illustrates a first exemplary arrangement a plurality of light guides of the overlay panel in a specific pattern over pixels on a display device, in accordance with an embodiment of the disclosure.

FIG. 3A illustrates a first exemplary arrangement of a plurality of light guides of the overlay panel in a specific pattern over pixels on a display device, in accordance with an embodiment of the disclosure. With reference to FIG. 3A, there is shown a plurality of pixels 302 (also represented by P1, P2, . . . , P12) and a plurality of light guides 304. There is also shown one pixel, such as a first pixel 302A, of the plurality of pixels 302, and a set of light guides 306.

In accordance with an embodiment, each of the plurality of light guides 304 may have a defined cross-sectional size at an input portion 304A and an output portion 304B. The cross-sectional size may determine a set of pixels or sub-pixels covered by each light guide of the plurality of light guides 304 when the overlay panel 102 is laid over the display device 104. The cross-sectional size may be varied based on a specified range of viewing distance for the display device 104. The specified range of viewing distance for the display device 104 may be a viewing distance with which a user may view the display device 104.

In accordance with an embodiment, the cross-sectional size of the plurality of light guides 304 may be same as that of a sub-pixel of a pixel, such as the first pixel 302A in the display portion 106 of the display device 104. For example, as shown in FIG. 3A, a certain number of light guides, such as the set of light guides 306 may cover a single pixel, such as the first pixel 302A on the display portion 106 of the display device 104. In a case when the user may be in close proximity to the display device 104, such arrangement of the set of light guides 306 covering the first pixel 302A on the display portion 106, may provide an enhanced resolution and viewing experience.

A first proximal distance of the user from the display device 104 may be based on a size of the display device 104. For example, if the user is viewing a display screen (such as the display device 104) of a mobile phone, the first proximal distance of the user from the display screen of the mobile phone may be in a range of "20 cm" to "100 cm". For such small distances, the display screen, such as the display device 104 may be required to display minute details of the displayed image. Therefore, multiple light guides, such as the set of light guides 304, may be aligned and arranged to cover a single pixel, such as the first pixel 302A, to minimize a degree of misalignment between the overlay panel 102 and the display device 104. Additionally, the plurality of light guides 304 may maintain a display resolution above a threshold for the specified range of viewing distance, for example the first proximal distance, and display minute details of the image clearly on the front display portion 110 of the overlay panel 102.

Figure 3B:
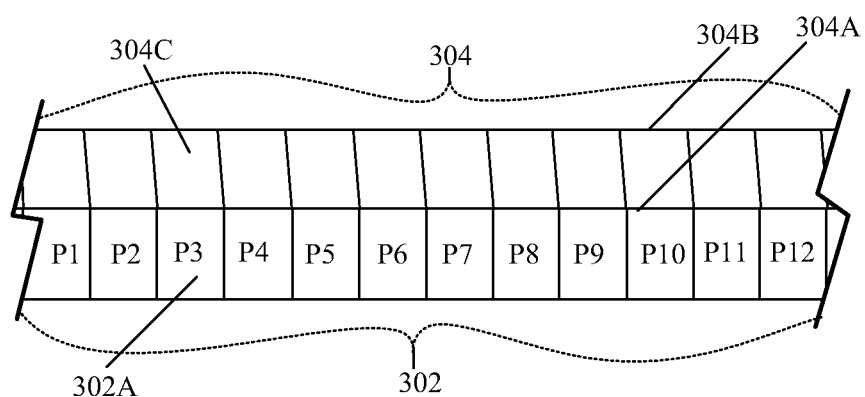
FIG. 3B illustrates a second exemplary arrangement a plurality of light guides of the overlay panel in a specific pattern over pixels on a display device, in accordance with an embodiment of the disclosure.

FIG. 3B illustrates a second exemplary arrangement of a plurality of light guides of the overlay panel in a specific pattern over pixels on a display device, in accordance with an embodiment of the disclosure. With reference to FIG. 3B, there is shown, the plurality of pixels 302 (also represented by P1, P2, . . . , P12) and a plurality of light guides 304. There is shown one pixel, such as the first pixel 302A, of the plurality of pixels 302 and one light guide, such as a first light guide 304C of the plurality of light guides 304. In accordance with an embodiment, the cross-sectional size each light guide of the plurality of light guides 304 may be same as that of a pixel, such as the first pixel 302A in the display portion 106 of the display device 104. For example, as shown in FIG. 3B, each light guide, such as the first light guide 304C, may cover a single pixel, such as the first pixel 302A on the display portion 106 of the display device 104. The first light guide 304C, of the plurality of light guides 304, may cover the first pixel 302A, based on the specified range of viewing distance for the display device 104.

For example, a user may be viewing a display screen of a television (e.g., the display device 104) from a second proximal distance from the display screen of television. In such a case, the second proximal distance of the user may be greater than the first proximal distance of the user. For example, the second proximal distance may be in a range of "5 feet" to "13 feet", based on the size of the display screen, such as the display device 104. The second proximal distance may be a normal viewing distance from which the user may view the display screen of the television. Furthermore, the minute details of the image may not be viewed by the user that may be viewing the image on the display screen (such as the display device 104) of the television from the second proximal distance. Therefore, each light guide, such as the first light guide 304C, may be aligned and arranged to cover one pixel, such as the first pixel 302A, to minimize a degree of misalignment between the overlay panel 102 and the display device 104. Additionally, the plurality of light guides 304 may maintain a display resolution above a threshold for the specified range of viewing distance, for example the second proximal distance, to display the image clearly on the front display portion 110 of the overlay panel 102.

Figure 3C:
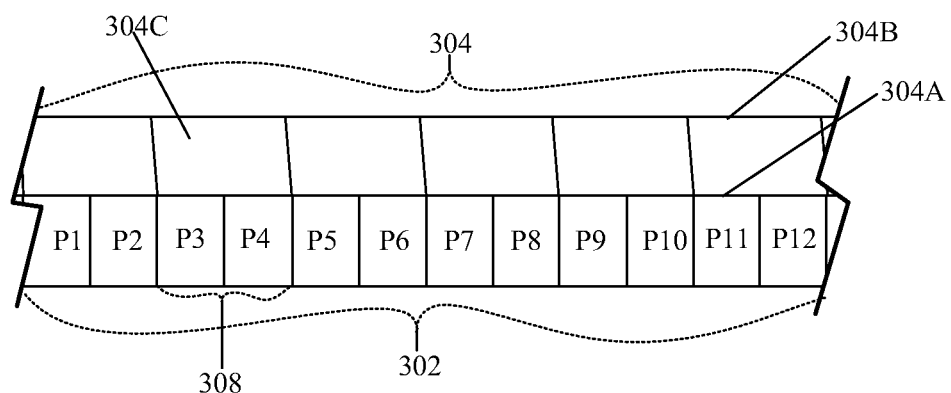
FIG. 3C illustrates a third exemplary arrangement a plurality of light guides of the overlay panel in a specific pattern over pixels on a display device, in accordance with an embodiment of the disclosure.

FIG. 3C illustrates a third exemplary arrangement of a plurality of light guides of the overlay panel in a specific pattern over pixels on a display device, in accordance with an embodiment of the disclosure. With reference to FIG. 3C, there is shown, the plurality of pixels 302 (also represented by P1, P2, . . . , P12) and the plurality of light guides 304. There is also shown a group of pixels 308 and one light guide, such as the first light guide 304C, of the plurality of light guides 304. In accordance with an embodiment, the cross-sectional size of each light guide of the plurality of light guides 304 may be larger than a single pixel. For example, as shown in FIG. 3C each light guide, such as the first light guide 304C, may be aligned and arranged to cover a group of pixels, such as the group of pixels 308, in the localized region of the display portion 106 of the display device 104. The first light guide 304C, of the plurality of light guides 304, may cover the group of pixels 308, based on the specified range of viewing distance for the display device 104. The group of pixels 308, may comprise a number of pixels, for example, "2" pixels (as shown in FIG. 3C) based on the size of the display device 104 and the specified range of viewing distance of the user. For example, in a case when the user may be viewing a display screen, such as the display device 104, of an advertisement flyer, the user may be at a third proximal distance from the display screen of the advertisement flyer (a large screen). In such a case, the third proximal distance of the user may be greater than the first proximal distance and the second proximal distance of the user. For example, the third proximal distance of the user may be in a range of "20 feet" to "100 feet", based on the size of the display screen, such as the display device 104. Furthermore, the minute details of the image may not be viewed by the user that may be viewing the image on a large display screen (such as the display device 104) of the advertisement flyer from the third proximal distance. Therefore, the first light guide 304C, of the plurality of light guides 304, may be aligned and arranged to cover a certain number of pixels, such as the group of pixels 308, to minimize a degree of misalignment between the overlay panel 102 and the display device 104. Additionally, the plurality of light guides 304 may maintain a display resolution above a threshold for the specified range of viewing distance, for example the third proximal distance, and display the image clearly on the front display portion 110 of the overlay panel 102.

In accordance with an alternative embodiment, the cross-sectional size of the plurality of light guides, such as the plurality of light guides 304, may vary for different regions of the display portion 106 of the display device 104. The cross-sectional size of the plurality of light guides 304 may vary for different regions of the display portion 106, based on a requirement, the specified range of viewing distance and/or the size of the display device 104.

Figure 4A:
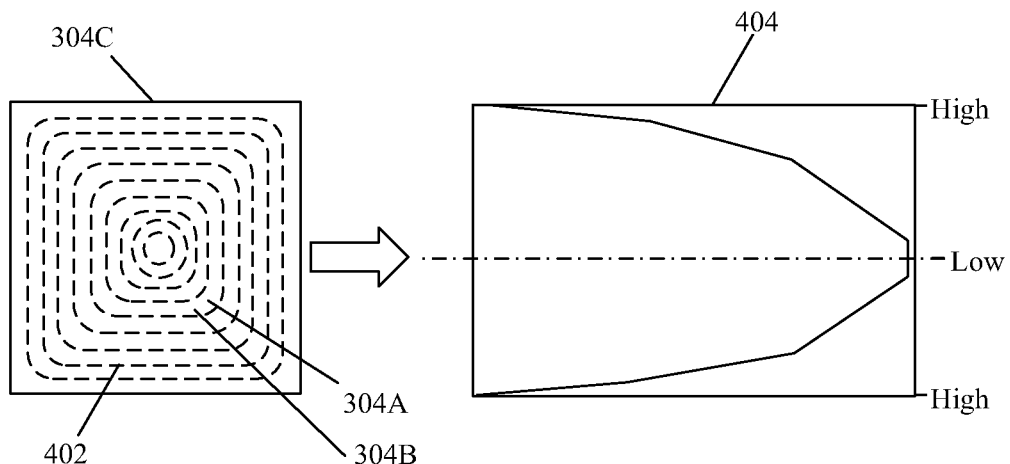
FIG. 4A illustrates an exemplary scenario that depicts a variance in refractive index of a light guide among a plurality of light guides of an exemplary overlay panel, in accordance with an embodiment of the disclosure.

FIG. 4A illustrates an exemplary scenario that depicts a variance in refractive index of a light guide among a plurality of light guides of an exemplary overlay panel, in accordance with an embodiment of the disclosure. With reference to FIG. 4A, there is shown a first pattern of layers 402 of the first light guide 304C and a refractive index profile 404 of the first light guide 304C. In accordance with an embodiment, the plurality of light guides 304 may be a plurality of optical fibers. Each light guide, such as the first light guide 304C, of the plurality of light guides 304 may comprise a core region surrounded by a clad region of an optical fiber. The core region of each light guide, such as the first light guide 304C, may comprise a plurality of layers that may be arranged in the first pattern of layers 402 (as shown in FIG. 4A as dashed lines). In certain other scenarios, the plurality of layers of the first light guide 304C may be arranged in different patterns, without an effect on the functional performance of the light guide. The plurality of layers of the first light guide 304C arranged in the first pattern of layers 402, may have varying refractive indices. In accordance with an embodiment, the first pattern of layers 402 of the plurality of layers of the first light guide 304C may be arranged in a concentric pattern. The refractive index profile 404 may represent the varying refractive index of the plurality of layers of the first light guide 304C.

The refractive index of the first pattern of layers 402 of the first light guide 304C may vary along a radius of a cross-section of the input portion 304A of each light guide, such as the first light guide 304C. The refractive index profile 404 may depict a variation in refractive index of the first light guide 304C, with respect to a top-view of the first light guide 304C. The top-view of the first light guide 304C is represented with respect to a field-of-view of the user for the display device 104. In accordance with an embodiment, the variation of the refractive index profile 404 at the input portion 304A of the first light guide 304C may be one of a convex refractive index profile, a concave refractive index profile, and a parabolic refractive index profile. The refractive index profile 404 may vary along the plurality of layers present in each light guide, such as the first light guide 304C, along the radius of the cross-section. The refractive index profile 404 shows that variance in refractive index of the first pattern of layers 402 of the first light guide 304C may decrease from a high refractive index to a low refractive index, along the radius of the cross-section towards the center of the first light guide 304C.

In accordance with an embodiment, the refractive index profile 404 may vary so as to transfer the excitation (such as light) with a uniform distribution of the excitation at the front display portion 110 of the overlay panel 102. Alternatively stated, the refractive index profile 404 may vary to impart the uniform distribution of excitation (or light) on the front display portion 110 of the overlay panel 102 to the user viewing the display device 104. In accordance with an embodiment, the refractive index profile 404 of each light guide, such as the first light guide 304C may be varied such that the excitation (or light) from the set of pixels or sub-pixels of in the display portion 106 of the display device 104 may be guided along an intended path from the input portion 304A to the output portion 304B of the first light guide 304C. The excitation (or light) that may be guided from the input portion 304A to the output portion 304B of the first light guide 304C may be displayed at the corresponding position on the front display portion 110 of the overlay panel 102. The variance in the refractive index profile 404 may be utilized to scale the image displayed on the display portion 106 of the display device 104 and display the image on the front display portion 110 of the overlay panel 102.

Figure 4B:
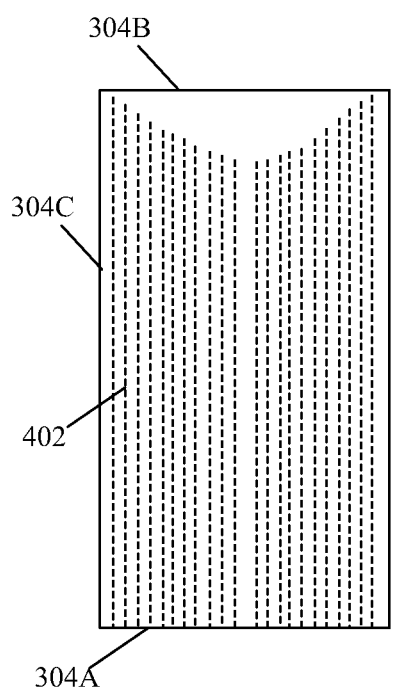
FIG. 4B illustrates a side view of the light guide of FIG. 4A, having a varying refractive index profile for a first pattern of layers of the plurality of layers of the light guide, in accordance with an embodiment of the disclosure.

FIG. 4B illustrates a side view of the light guide of FIG. 4A, having a varying refractive index profile for a first pattern of layers of the plurality of layers of the light guide, in accordance with an embodiment of the disclosure. With reference to FIG. 4B, there is shown the first light guide 304C and the first pattern of layers 402 of the first light guide 304C. As shown and described in FIG. 4A, the core region of each light guide, such as the first light guide 304C, may comprise a refractive index profile, such as the refractive index profile 404 that may vary along a radius of a cross-section of the input portion 304A of each light guide, such as the first light guide 304C. A plurality of internal layers of the plurality of layers of the first light guide 304C may not extend to the output portion 304B of the first light guide 304C. Therefore, the plurality of internal layers may not contribute to impart the uniform distribution of excitation (or light) on the front display portion 110 of the overlay panel 102 to the user viewing the display device 104. In accordance with an embodiment, the variation of the refractive index profile 404 of the first pattern of layers 402 at the input portion 304A of the first light guide 304C may be one of the convex refractive index profile, the concave refractive index profile, and the parabolic refractive index profile. In accordance with an embodiment, the refractive index at the output portion 304B of the first light guide 304C, which is connected to the front display portion 110 of the overlay panel 102 may be equivalent to the refractive index of the plurality of layers. In accordance with another embodiment, the refractive index at the output portion 304B of the first light guide 304C, which is connected to the front display portion 110 of the overlay panel 102 may be different than the refractive index of the plurality of layers arranged in the first pattern of layers 402. The refractive index of the first pattern of layers 402 of the plurality of layers of each light guide, such as the first light guide 304C, may vary based on the desired characteristics for producing an even distribution of light on the output portion 304B of the first light guide 304C of the plurality of light guides 304 facing the user. Additionally, at an edge of the display device 104, an angle of the plurality of light guides 304 may vary in both horizontal direction and vertical direction.

Figure 4C:
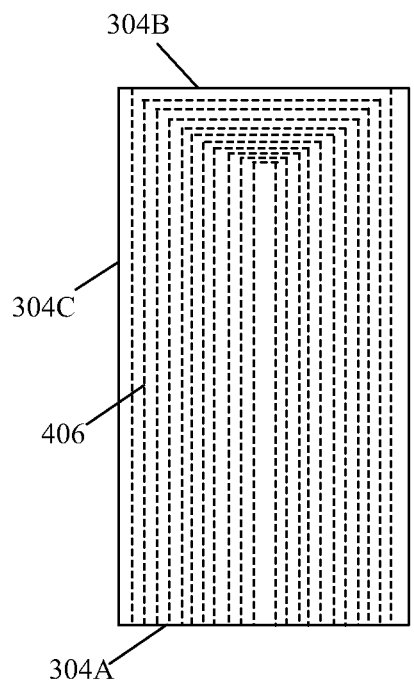
FIG. 4C illustrates a side view of the light guide of FIG. 4A, having a varying refractive index profile for a second pattern of layers of the plurality of layers of the light guide, in accordance with an embodiment of the disclosure.

FIG. 4C illustrates a side view of the light guide of FIG. 4A, having a varying refractive index profile for a second pattern of layers of the plurality of layers of the light guide, in accordance with an embodiment of the disclosure. With reference to FIG. 4C, there is shown the first light guide 304C and a second pattern of layers 406 of the plurality of layers of the first light guide 304C. In accordance with an embodiment, the plurality of layers of the first light guide 304C may be arranged as the second pattern of layers 406, as shown in FIG. 4C as dashed lines. The second pattern of layers 406 of the light guide, such as the first light guide 304C, may be a convex pattern at the output portion 304B of the first light guide 304C. In accordance with an embodiment, the second pattern of layers 406 of the light guide, such as the first light guide 304C, may be a parabolic pattern at the output portion 304B of the first light guide 304C.

Figure 4D:
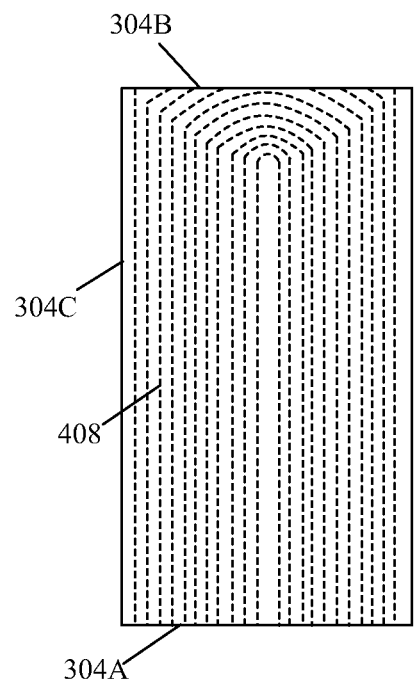
FIG. 4D illustrates a side view of the light guide of FIG. 4A, having a varying refractive index profile for a third pattern of layers of the plurality of layers of the light guide, in accordance with an embodiment of the disclosure.

FIG. 4D illustrates a side view of the light guide of FIG. 4A, having a varying refractive index profile for a third pattern of layers of the plurality of layers of the light guide, in accordance with an embodiment of the disclosure. With reference to FIG. 4D, there is shown the first light guide 304C and a third pattern of layers 408 of the plurality of layers of the first light guide 304C. In accordance with an embodiment, the plurality of layers of the first light guide 304C may be arranged as the third pattern of layers 408, as shown in FIG. 4D as dashed lines. The third pattern of layers 408 of the light guide, such as the first light guide 304C, may be a convex pattern at the output portion 304B of the first light guide 304C. In accordance with an embodiment, the third pattern of layers 408 of the light guide, such as the first light guide 304C, may be a parabolic pattern at the output portion 304B of the first light guide 304C.

Figure 4E:
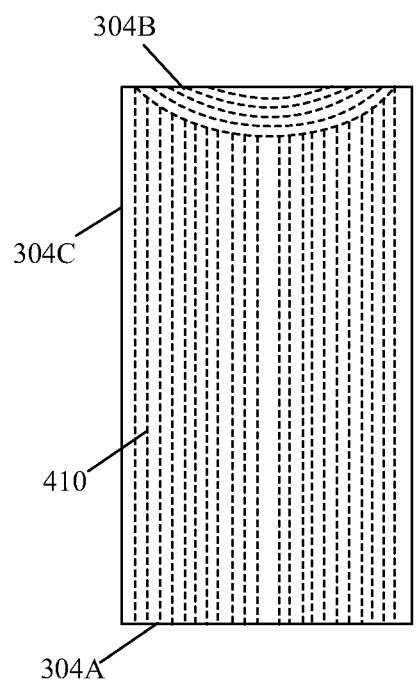
FIG. 4E illustrates a side view of the light guide of FIG. 4A, having a varying refractive index profile for a fourth pattern of layers of the plurality of layers of the light guide, in accordance with an embodiment of the disclosure.

FIG. 4E illustrates a side view of the light guide of FIG. 4A, having a varying refractive index profile for a fourth pattern of layers of the plurality of layers of the light guide, in accordance with an embodiment of the disclosure. With reference to FIG. 4E, there is shown the first light guide 304C and a fourth pattern of layers 410 of the plurality of layers of the first light guide 304C. In accordance with an embodiment, the plurality of layers of the first light guide 304C may be arranged as the fourth pattern of layers 410, as shown in FIG. 4E as dashed lines. The fourth pattern of layers 410 of the light guide, such as the first light guide 304C, may be a convex pattern at the output portion 304B of the first light guide 304C. In accordance with an embodiment, the fourth pattern of layers 410 of the light guide, such as the first light guide 304C, may be a parabolic pattern at the output portion 304B of the first light guide 304C.

Figure 4F:
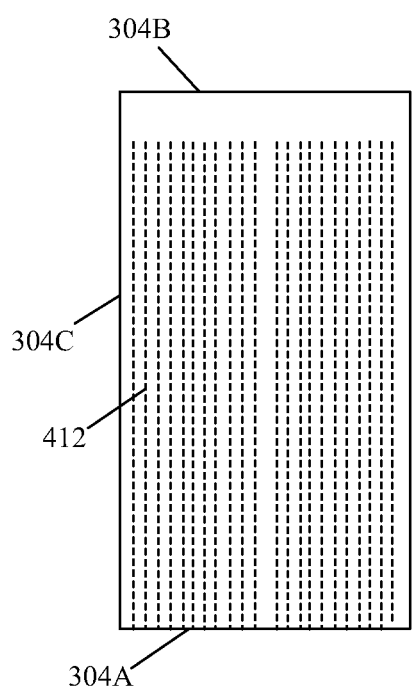
FIG. 4F illustrates a side view of the light guide of FIG. 4A, having a varying refractive index profile for a fifth pattern of layers of the plurality of layers of the light guide, in accordance with an embodiment of the disclosure.

FIG. 4F illustrates a side view of the light guide of FIG. 4A, having a varying refractive index profile for a fifth pattern of layers of the plurality of layers of the light guide, in accordance with an embodiment of the disclosure. With reference to FIG. 4F, there is shown the first light guide 304C and a fifth pattern of layers 412 of the plurality of layers of the first light guide 304C. In accordance with an embodiment, the plurality of layers of the first light guide 304C may be arranged as the fifth pattern of layers 412, as shown in FIG. 4F as dashed lines. The fifth pattern of layers 412 of the light guide, such as the first light guide 304C, may be a flat pattern at the output portion 304B of the first light guide 304C.

Figure 4G:
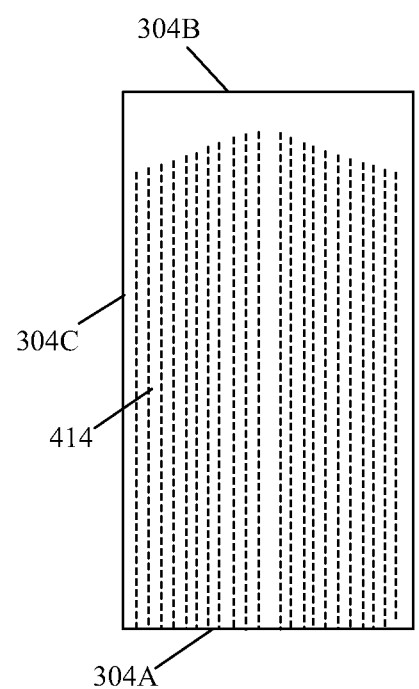
FIG. 4G illustrates a side view of the light guide of FIG. 4A, having a varying refractive index profile for a sixth pattern of layers of the plurality of layers of the light guide, in accordance with an embodiment of the disclosure.

FIG. 4G illustrates a side view of the light guide of FIG. 4A, having a varying refractive index profile for a sixth pattern of layers of the plurality of layers of the light guide, in accordance with an embodiment of the disclosure. With reference to FIG. 4G, there is shown the first light guide 304C and a sixth pattern of layers 414 of the plurality of layers of the first light guide 304C. In accordance with an embodiment, the plurality of layers of the first light guide 304C may be arranged as the sixth pattern of layers 414, as shown in FIG. 4G as dashed lines. The sixth pattern of layers 414 of the light guide, such as the first light guide 304C, may be a concave pattern at the output portion 304B of the first light guide 304C. In accordance with an embodiment, the sixth pattern of layers 414 of the light guide, such as the first light guide 304C, may be a parabolic pattern at the output portion 304B of the first light guide 304C.

In accordance with an embodiment, the first pattern of layers 402 (FIG. 4B), the second pattern of layers 406 (FIG. 4C), the third pattern of layers 408 (FIG. 4D), the fourth pattern of layers 410 (FIG. 4E), the fifth pattern of layers 412 (FIG. 4F), and the sixth pattern of layers 414 (FIG. 4G) of the light guide, such as the first light guide 304C, may diffuse the excitation received from the input portion 304A of the first light guide 304C at the output portion 304B of the first light guide 304C that is connected to the overlay panel 102, as viewed by the user. The dashed lines of the first pattern of layers 402 (FIG. 4B), the second pattern of layers 406 (FIG. 4C), the third pattern of layers 408 (FIG. 4D), the fourth pattern of layers 410 (FIG. 4E), the fifth pattern of layers 412 (FIG. 4F), and the sixth pattern of layers 414 (FIG. 4G) of the plurality of layers of the first light guide 304C may represent boundaries of regions in the first light guide 304C, with different refractive index.

In some embodiments, the plurality of layers of the first light guide 304C may be arranged in patterns that is different from the first pattern of layers 402 (FIG. 4B), the second pattern of layers 406 (FIG. 4C), the third pattern of layers 408 (FIG. 4D), the fourth pattern of layers 410 (FIG. 4E), the fifth pattern of layers 412 (FIG. 4F), and the sixth pattern of layers 414 (FIG. 4G), without a deviation from the scope of the present disclosure. Such patterns may nor may not have an effect on the functional performance of a light guide (e.g., the first light guide 304C). A pattern of layers may be selected for a light guide (e.g. first light guide 304C), to have a uniform distribution of excitation, at the output portion of the light guide (e.g. first light guide 304C), received from the display portion 106 of the display device 104. Also, the pattern of layers may be selected to enhance or retain a quality of the image, displayed on the overlay panel 102, with respect to that displayed on the display device 104. Based on the uniform distribution of the excitation, the overlay panel 102 may display an image that may be indistinguishable from the image displayed on the display portion 106 of the display device 104, as viewed by a user.

Figure 5A:
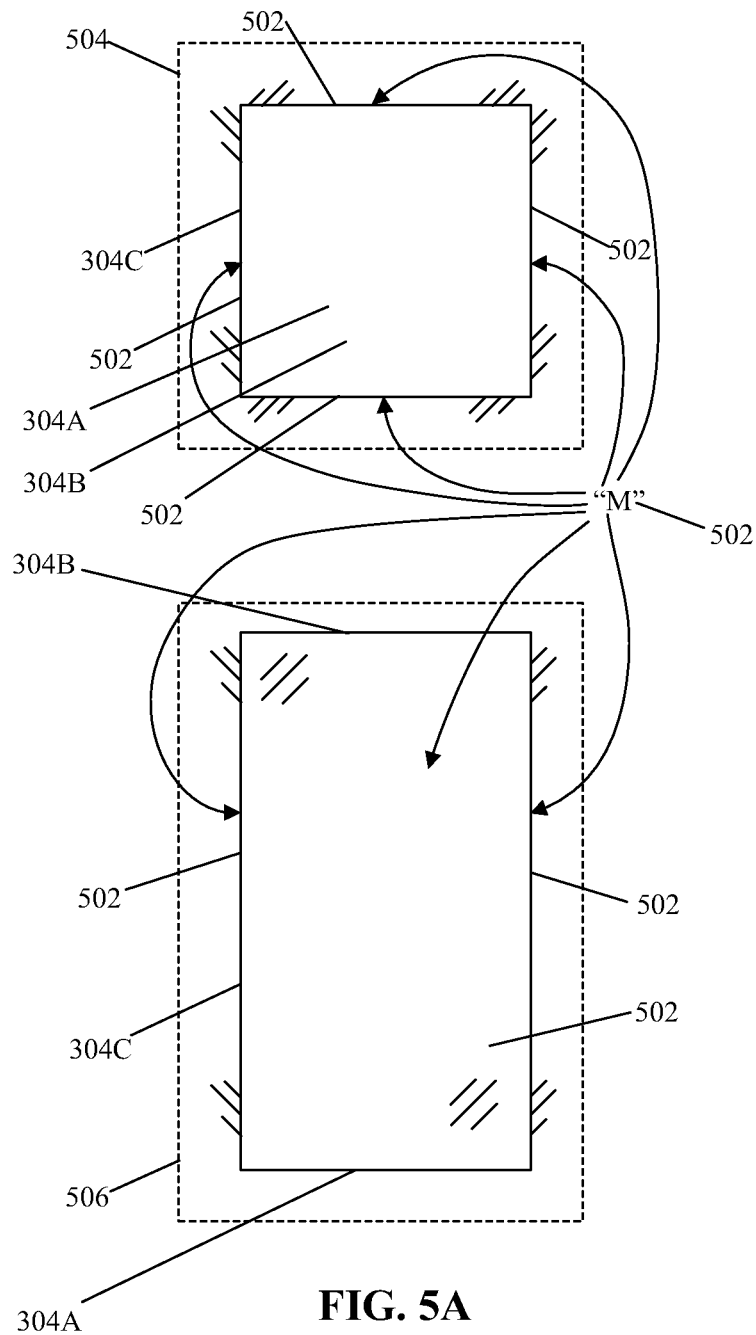
FIG. 5A illustrates a scenario of constant refractive index of a light guide from a plurality of light guides, in accordance with an embodiment of the disclosure.

FIG. 5A illustrates a scenario of constant refractive index of a light guide from a plurality of light guides, in accordance with an embodiment of the disclosure. With reference to FIG. 5A, there is shown a top view 504 and a side view 506 of the first light guide 304C with a reflective mirror coating 502 (also represented as "M").

In accordance with an embodiment, each light guide, such as the first light guide 304C, may be an optical fiber with a refractive index profile that is a constant value along the radius of a cross-section of each light guide of the plurality of light guides 304. In such cases, the reflective mirror coating 502 ("M") may be present on sides or a curved surface of each light guide. For example, as shown in the top view 504 and the side view 506 of the first light guide 304C, the reflective mirror coating 502 ("M") may be present on the first light guide 304C where the refractive index of the first light guide 304C is constant. Additionally, the reflective mirror coating 502 ("M") may maintain the constant value of the refractive index profile along the radius of the cross-section of each light guide, such as the first light guide 304C, of the plurality of light guides. In accordance with an embodiment, the excitation (or light) from the set of pixels or sub-pixels of the display portion 106 of the display device may be guided along the intended path from the input portion 304A towards the output portion 304B of the first light guide 304C. The excitation (or light) may be guided along the intended path, based on a reflection of the excitation along a reflective surface of the reflective mirror coating 502 ("M"). The guided excitation may be subsequently displayed at a corresponding position on the front display portion 110 of the overlay panel 102. Each light guide, such as the first light guide 304C, may transfer the excitation from the input portion 304A to the output portion 304B, even when the refractive index may be constant, based on the reflective mirror coating 502 ("M") present on sides or a curved surface of each light guide, such as the first light guide 304C. The reflection of the excitation along the reflective surface of the reflective mirror coating 502 ("M") may be utilized to scale the image displayed on the display portion 106 of the display device 104 and display the scaled image on the front display portion 110 of the overlay panel 102.

Figure 5B:
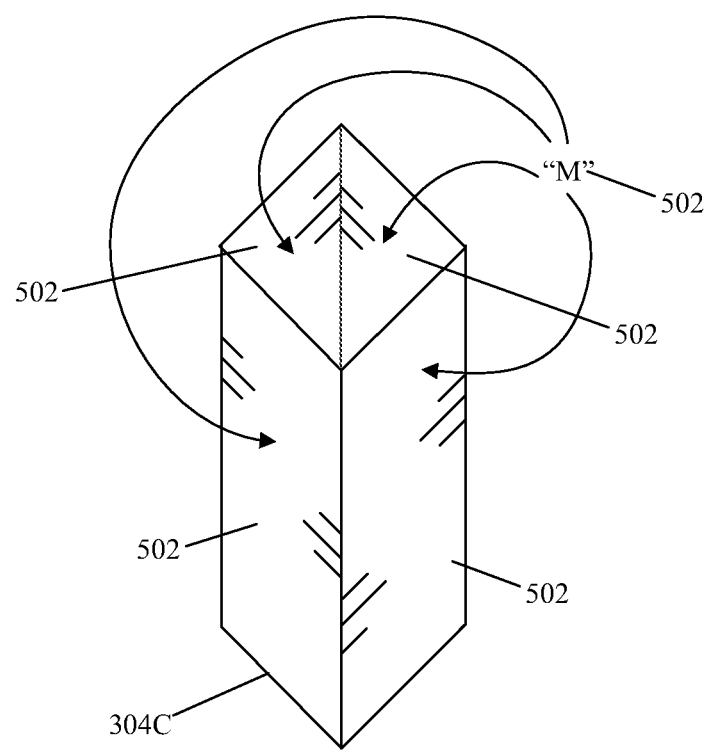
FIG. 5B illustrates a perspective view of the light guide of FIG. 5A, in accordance with an embodiment of the disclosure.

FIG. 5B illustrates a perspective view of the light guide of FIG. 5A, in accordance with an embodiment of the disclosure. With reference to FIG. 5B, there is shown the first light guide 304C and the reflective mirror coating 502 ("M"). In accordance with an embodiment, the first light guide 304C may be a rectangular light guide. In some embodiments, the shape of the light guide, such as the first light guide 304C, may be circular, oval, or other geometrical shapes. The first light guide 304C may be a clear plastic light guide and interior of the first light guide 304C may be transparent. The reflective mirror coating 502 ("M") may be present on the sides of the first light guide, as shown in FIG. 5B. The reflective mirror coating 502 ("M") may not be present on the input portion 304A (as shown in FIG. 5A) and the output portion 304B (as shown in FIG. 5A) of the first light guide 304C. In accordance with an embodiment, the refractive index of the first light guide 304C of FIG. 5B, may be non-varying.

In accordance with an embodiment, the exemplary scenario that depicts the variance in refractive index of a light guide, as described in FIGS. 4A, 4B, 4C, 4D, 4E, 4F and 4G, and the scenario of constant refractive index of a light guide, as described in FIGS. 5A and 5B, may be utilized together. For example, in a case where some of the light guides of the plurality of light guides 304 may exhibit variance in refractive index and remaining light guides of the plurality of light guides 304 may exhibit constant refractive index. In such cases, properties of the plurality of light guides that exhibit variance in refractive index and the properties of the plurality of light guides that exhibit constant refractive index may be utilized together.

Figure 6:
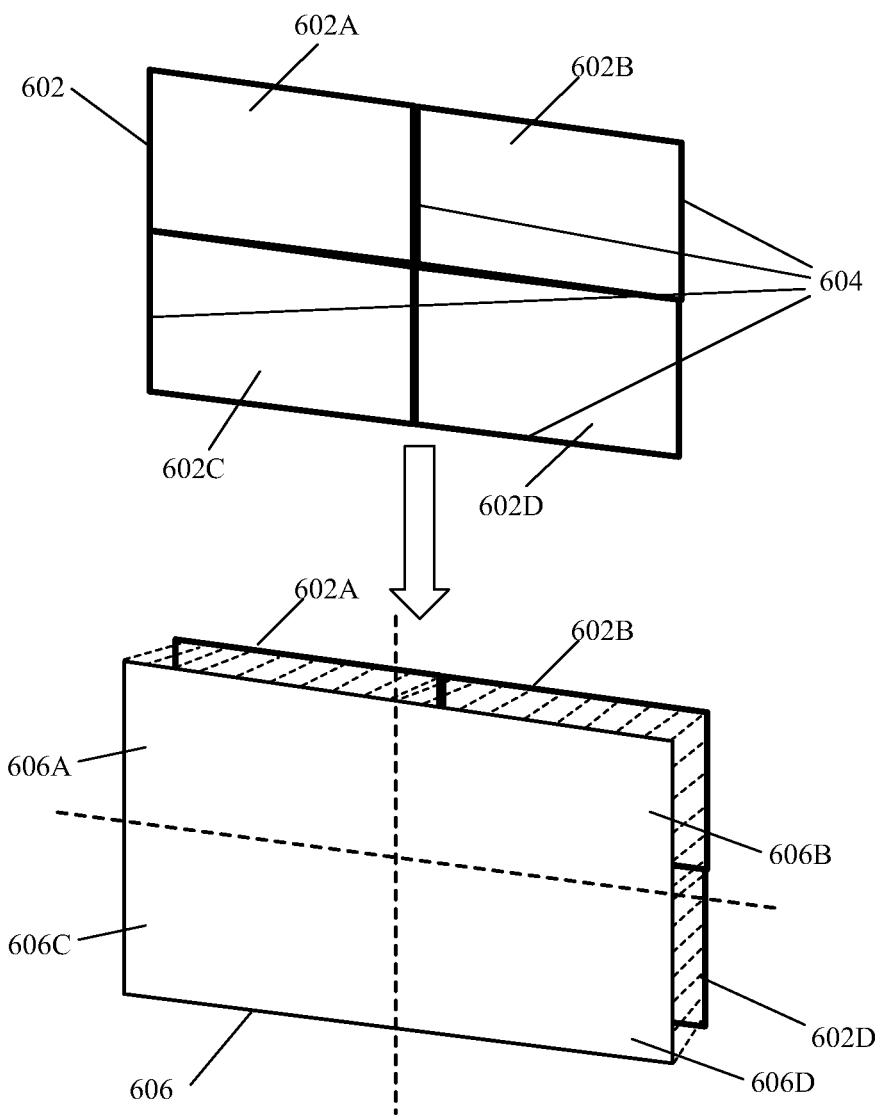
FIG. 6 illustrates a first exemplary multi-panel display device, in accordance with an embodiment of the disclosure.

FIG. 6 illustrates a first exemplary multi-panel display device, in accordance with an embodiment of the disclosure. With reference to FIG. 6, there is shown a first multi-panel display device 602 having a first display panel 602A, a second display panel 602B, a third display panel 602C, a fourth display panel 602D, and a bezel region 604 of the first multi-panel display device 602. There is further shown an overlay panel 606, a first overlay panel 606A, a second overlay panel 606B, a third overlay panel 606C, and a fourth overlay panel 606D, with reference to FIG. 6. In accordance with an embodiment, the display device 104 may correspond to the first multi-panel display device 602. The first multi-panel display device 602 may include a plurality of display panels, such as the first display panel 602A, the second display panel 602B, the third display panel 602C and the fourth display panel 602D. Each display panel of the plurality of display panels may include a display portion, such as the display portion 106 and a bezel portion, such as the bezel portion 108.

In accordance with an embodiment, the first multi-panel display device 602 may comprise the plurality of display panels arranged side by side in accordance with a first arrangement pattern for the plurality of display panels. The first arrangement pattern may be one of a flat rectangular, a flat square, or a curved arrangement pattern for the plurality of display panels. For example, as shown in FIG. 6, the first display panel 602A, the second display panel 602B, the third display panel 602C and the fourth display panel 602D are arranged in the first arrangement pattern, and form a "2×2" first multi-panel display device 602. The first multi-panel display device 602 may comprise the plurality of display panels, based on a required display size, a required aspect ratio of the first multi-panel display device 602, and a field of utilization of the first multi-panel display device 602. For example, the number of display panels in the first multi-panel display device 602 may be "16" that may form a "4×4" multi-panel display device or an "8×2" multi-panel display device, based on the aspect ratio of the first multi-panel display device 602. The first multi-panel display device 602 may comprise a cumulative bezel region, such as the bezel region 604, which may include the plurality of bezel portions of the plurality of display panels, such as the first display panel 602A and the like.

In accordance with an embodiment, a single overlay panel, such as the overlay panel 606 may be arranged over a cumulative surface of the first multi-panel display device 602. The overlay panel 606 may have same functionalities and design as that of the overlay panel 102, as described in FIGS. 1A, 1B and 1C, FIGS. 2A and 2B, FIGS. 3A, 3B and 3C, FIGS. 4A, 4B, 4C, 4D, 4E, 4F and 4G and FIGS. 5A and 5B. The front display portion, for example the front display portion 110 (FIG. 1), of the overlay panel 606 may be disposed on the cumulative surface area of the first multi-panel display device 602. The cumulative surface area of the first multi-panel display device 602 may include a plurality of display portions, for example the display portion 106 (FIG. 1), and a plurality of bezel portions, for example the bezel portion 108 (FIG. 1), of the first multi-panel display device 602. Therefore, the image displayed on the first multi-panel display device 602 may be scaled based on the equal scaling factor to be displayed on the front display portion of the overlay panel 606. The image displayed on the front display portion of the overlay panel 606 may be seamlessly viewable by the user. Alternatively stated, the bezel region 604 may be concealed by the front display portion of the overlay panel 606, such that the image displayed on the front display portion of the overlay panel 606 may be seamless. The image displayed on the front display portion of the overlay panel 606 may be larger in size than the image displayed on the plurality of display portions of the plurality of display panels on the first multi-panel display device 602.

In accordance with another embodiment, instead of a single overlay panel, a plurality of overlay panels may be arranged on the first multi-panel display device 602 that comprises the plurality of display panels. For example, as shown in FIG. 6, the plurality of overlay panels may comprise the first overlay panel 606A, the second overlay panel 606B, the third overlay panel 606C, and the fourth overlay panel 606D. Each overlay panel, such as the first overlay panel 606A, of the plurality of overlay panels may be mounted on the display portion and the bezel portion of each display panel, such as the first display panel 602A, of the plurality of display panels of the first multi-panel display device 602. Each overlay panel, such as the first overlay panel 606A, may comprise a front display portion (for example the front display portion 110 in FIG. 1) arranged over the display portion (for example the display portion 106 in FIG. 1) and the bezel portion (for example the bezel portion 108 in FIG. 1) of the display panel, such as the first display panel 602A. Each overlay panel, such as the first overlay panel 606A may further comprise a guiding portion (for example the guiding portion 112 in FIG. 1) that comprises the plurality of light guides arranged in the specific pattern between the front display portion and the display portion of the display panel, such as the first display panel 602A. The plurality of light guides may be arranged such that the input portion of each light guide may be aligned with a set of pixels or sub-pixels of a plurality of pixels present in the display portion of the display panel, for example as shown and described in FIGS. 3A, 3B and 3C. Additionally, an output portion of each light guide of the plurality of light guides may be coupled to the front display portion, for example, as shown and described in FIGS. 3A, 3B and 3C. The arrangement of each light guide in the guiding portion of each overlay panel, such as the first overlay panel 606A, may transfer excitation (or light), caused by the set of pixels or sub-pixels. The excitation may be transferred from the input portion to the output portion of each light guide at the front display portion of each overlay panel, such as the first overlay panel 606A.

In accordance with an embodiment, the front display portion of each overlay panel, such as the first overlay panel 606A, may display an image that may cover the bezel portion and the display portion of the display panel, such as the first display panel 602A. The image may be displayed at the front display portion of the overlay panel, such as the first overlay panel 606A, such that each pixel in the image may be scaled by the equal scaling factor with respect to each pixel in display portion of the display panel, such as the first display panel 602A. In accordance with an embodiment, the image displayed at the front display portion of each overlay panel, such as the first overlay panel 606A may be a fragment of a complete image to be displayed at the first multi-panel display device 602. Each fragment of the complete image displayed at the front display portion of each overlay panel, such as the first overlay panel 606A may correspond to the fragment of the complete image displayed on the corresponding display panel, such as the first display panel 602A. Each display panel, such as the first display panel 602A, of the plurality of display panels may be affixed with the front display portion and the guiding portion such that the image on the first multi-panel display device 602 is seamlessly viewable. The dashed lines in FIG. 6 from the overlay panel 606 towards the first multi-panel display device 602 depict a relative position of the plurality of display panels behind the plurality of overlay panels. In some embodiments, the first multi-panel display device 602 may also be utilized as video walls. The video walls may comprise the plurality of display panels to form a large display screen on a wall. In such video walls, when the plurality of display panels are mounted by the plurality of overlay panels or single large overlay panel, the image displayed on the video walls may be seamless throughout the video wall. Therefore, viewing experience of the user that may be viewing images or other media content on such video walls may not change with change in view-point of the user.

FIG. 7A illustrates a second exemplary multi-panel display device, in accordance with an embodiment of the disclosure. With reference to FIG. 7, there is shown a second multi-panel display device 702 and a plurality of overlay panels 704. In accordance with an embodiment, the display device 104 may be a second multi-panel display device 702. The second multi-panel display device 702 may include a plurality of display panels, (for example the plurality of display panels as shown in FIG. 6), arranged in accordance with a second arrangement pattern for the plurality of display panels. The number of the plurality of display panels of the second multi-panel display device 702 may be determined, based on a required size or a required aspect ratio of the second multi-panel display device 702. The number display panels in the second multi-panel display device 702 may be determined, further based on an application area (e.g., a news room, a billboard, an airport digital signage, etc.) for the second multi-panel display device 702, as described in FIG. 6. For example, as shown in 7A, the number display panels of the second multi-panel display device 702, may be "16" such that, an "8×2" multi-panel display device may be formed. In accordance with an embodiment, the second arrangement pattern of the plurality of display panels of the second multi-panel display device 702 may be a curved arrangement pattern, as shown in FIG. 7A. The curved arrangement pattern of the plurality of display panels of the second multi-panel display device 702 forms video walls which may represent a curved surface. In certain scenarios, the arrangement pattern of the plurality of display panels of the second multi-panel display device 702 may not represent a curved surface. The arrangement pattern of the second multi-panel display device 702 may be flat, a convex pattern, or a concave pattern, in accordance with an embodiment. In a case, in which the arrangement pattern of the second multi-panel display device 702 is the convex pattern, the size of the overlay panel 102 may be larger than the bezel portion 108 so as to allow the display device 104 to accommodate the convex pattern for arrangement of the overlay panel 102 on the display device 104 without gaps.

In accordance with an embodiment, the second multi-panel display device 702 may be mounted by the plurality of overlay panels 704 as shown in FIG. 7A. The plurality of overlay panels 704 may have same functionalities and design as that of the overlay panel 102, as described in FIGS. 1A, 1B, 1C, 2A, 2B, 3A, 3B, 3C, 4A, 4B, 4C, 4D, 4E, 4F, 4G, 5A and 5B. Each overlay panel of the plurality of overlay panels 704 may be mounted on the display portion and the bezel portion of each display panel of the plurality of display panels of the second multi-panel display device 702. Each overlay panel of the plurality of display panels may comprise a front display portion (for example the front display portion 110 in FIG. 1) arranged over the plurality of display panels of the second multi-panel display device 702. Each overlay panel of the plurality of overlay panels 704 may further comprise a guiding portion (for example the guiding portion 112 in FIG. 1) that comprises the plurality of light guides arranged in the specific pattern between the front display portion and the display portion of the display panel. Each light guide of the plurality of light guides may transfer excitation or light from display portion of the display panel to the front display portion of the plurality of overlay panels 704. In some embodiment, a single overlay panel may be laid on the entire surface of the second multi-panel display device 702.

In accordance with an embodiment, the front display portion of each overlay panel of the plurality of overlay panels 704 may display the image based on the excitation received from the plurality of light guides. The image displayed on the front display portion of the plurality of overlay panels may conceal the bezel portion of the plurality of display panels of the second multi-panel display device 702. The image may be displayed on the curved arrangement of the second multi-panel display device 702. In accordance with an embodiment, the image displayed at the front display portion of each overlay panel may be a fragment of a complete image to be displayed at the second multi-panel display device 702. Each fragment of the complete image displayed at the front display portion of each overlay panel may correspond to the fragment of the complete image displayed on the corresponding display panel of the second multi-panel display device 702. The curved arrangement of the second multi-panel display device 702 may display the image or other media content, such as videos or movies, seamlessly to the user with an immersive curved TV-like experience. The angled dashed lines in FIG. 7A show a relative position of the plurality of display panels behind the plurality of overlay panels. In accordance with an embodiment, the second multi-panel display device 702 may be a curved video wall. The image viewed by the user on the plurality of overlay panels of the second multi-panel display device 702 arranged in the curved pattern, may be a distortion less image.

FIG. 7B illustrates a top view of the multi-panel display device of FIG. 7A arranged in a curved pattern, in accordance with an embodiment of the disclosure. With reference to FIG. 7B, there is shown a top view 706 of the second multi-panel display device 702 with the plurality of overlay panels 704 mounted on the second multi-panel display device 702. In accordance with an embodiment, the plurality of display panels of the second multi-panel display device 702 may be arranged in the curved pattern. The curved arrangement pattern may be convex curve pattern or concave curve pattern, in accordance with an embodiment. The plurality of overlay panels 704 may be mounted on the plurality of display panels of the second multi-panel display device 702. The plurality of overlay panels 704 may be mounted such that the front display portion of the plurality of overlay panels may cover the plurality of display panels of the second multi-panel display device 702 from edge-to-edge. The plurality of overlay panels 704 may cover the entire bezel portion and the display portion of the plurality of display panels of the second multi-panel display device 702. The relative positioning of each individual display panel of the second multi-panel display device 702 may take into account the technique used to attach the overlay panel 102 to the display device 104, using the plurality of side clips (such as the plurality of side clips 114 in FIG. 1B), adhesives or other mounting structures as described in FIGS. 1B and 1C.

Figure 8:
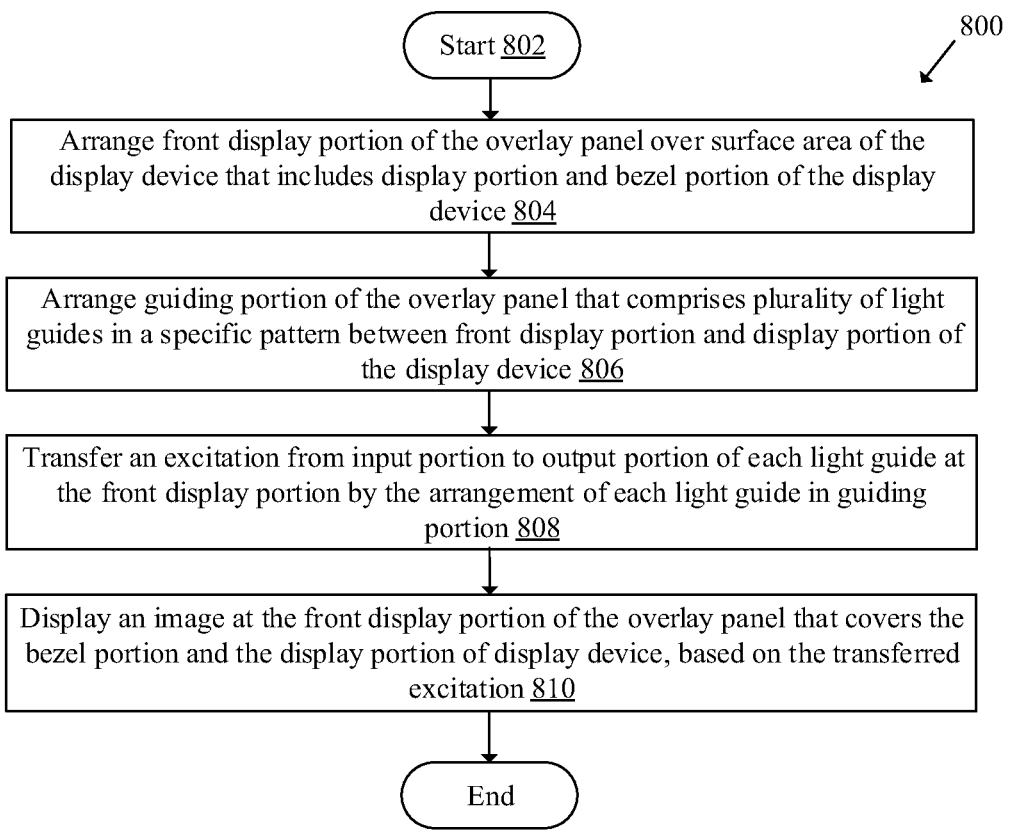
FIG. 8 is a flowchart that illustrates exemplary operations of an overlay panel with light guides for a display device, in accordance with an embodiment of the disclosure.

FIG. 8 is a flowchart that illustrates exemplary operations of an overlay panel with light guides for a display device, in accordance with an embodiment of the disclosure. With reference to FIG. 8, there is shown a flowchart 800. The flowchart 800 is described in conjunction with FIGS. 1A, 1B, 1C, 2A, 2B, 3A, 3B, 3C, 4A, 4B, 4C, 4D, 4E, 4F, 4G, 5A, 5B, 6, 7A and 7B. The operations of the flowchart 800 may start at 802 and proceed to 804.

At 804, the front display portion 110 of the overlay panel 102 may be arranged over a surface area of the display device 104 that includes the display portion 106 and the bezel portion 108 of the display device 104. The overlay panel 102 may be mounted on the surface area of the display device 104 using a support portion that may comprise one of the plurality of side clips 114, the adhesive material 116, or a combination of the plurality of side clips 114 and the adhesive material 116. The arrangement of the overlay panel 102 on the display device 104, is shown and described, for example in FIGS. 1A, 1B, 1C, 2A and 2B.

At 806, the guiding portion 112 of the overlay panel 102 that comprises the plurality of light guides (e.g. the plurality of light guides 304) may be arranged in a specific pattern between the front display portion 110 and the display portion 106 of the display device 104. The plurality of light guides 304 may be arranged such that the input portion of each light guide may be aligned with a set of pixels or sub-pixels of a plurality of pixels present in the display portion 106 of the display device 104. The arrangement of the plurality of light guides 304 in the guiding portion 112 of the overlay panel 102 is shown and described, for example in FIGS. 3A, 3B and 3C.

At 808, the arrangement of each light guide (e.g. first light guide 304 C) in the guiding portion 112 may transfer an excitation (or light), from the input portion (such as the output portion 304B) to the output portion (such as the output portion 304B) of each light guide (e.g. the first light guide 304C) at the front display portion 110. The transferred excitation may be caused by the set of pixels or sub-pixels of the plurality of pixels present in the display portion 106 of the display device 104. The transfer of excitation from the input portion 304A to the output portion 304B of the first light guide 304C is shown and described, for example in FIGS. 4A to 4G.

At 810, the front display portion 110 of the overlay panel 102 may display an image that covers the bezel portion 108 and the display portion 106 of the display device 104, based on the transferred excitation. The image may be displayed on the front display portion 110 of the overlay panel 102 such that each pixel in the image may be scaled by an equal scaling factor with respect to each pixel in the display portion 106 of the display device 104. The control may pass to end.

Various embodiments of the disclosure provide an overlay panel (such as the overlay panel 102) for a display device (such as the display device 104) that comprises a front display portion (such as the front display portion 110) and a guiding portion (such as the guiding portion 112). The front display portion of the overlay panel may be arranged over a surface area of the display device, such as the surface area may include a display portion (such as the display portion 106) and a bezel portion (such as the bezel portion 108) of the display device. The guiding portion of the overlay panel may comprise a plurality of light guides (such as the plurality of light guides 304) arranged in a specific pattern between the front display portion of the overlay panel and the display portion of the display device. The plurality of light guides may be arranged such that an input portion of each light guide of the plurality of light guides may be aligned with a set of pixels or sub-pixels of a plurality of pixels (such as the plurality of pixels 302) present in the display portion of the display device. Furthermore, the plurality of light guides may be arranged such that an output portion of each light guide may be coupled to the front display portion of the overlay panel. The arrangement of each light guide in the guiding portion may transfers excitation, caused by the set of pixels or sub-pixels, from the input portion to the output portion of each light guide at the front display portion. The excitation may cause the front display portion to display an image that covers the bezel portion and the display portion of the display device. The image may be displayed at the front display portion such that each pixel in the image may be scaled by an equal scaling factor with respect to each pixel in display portion of the display device.

In accordance with an embodiment, the overlay panel may further comprise a support portion that may comprise a plurality of side clips. The overlay panel may be mounted on the surface area of the display device by the plurality of side clips. The overlay panel may further comprise an adhesive material. The overlay panel may be mounted on the surface area of the display device based on an application of the adhesive material on a contact region between the display device and the overlay panel. In accordance with an embodiment, the overlay panel may be mounted on the surface area of the display device using a combination of a plurality of side clips and the adhesive material The guiding portion of the overlay panel may have a thickness that may be based on an extended length of the bezel portion above a plane of the display portion of the display device. The value of the equal scaling factor may be based on the guiding portion thickness.

In accordance with an embodiment, the front display portion may be at least one of a transparent region, a frosted region, a combination of the frosted region in center area of the front display portion and the transparent region at edges of the front display portion, or a combination of the transparent region in center area of the front display portion and the frosted region at edges of the front display portion. The front display portion may be a partially transparent region having a defined transmittance for incident excitation from the plurality of light guides. The partially transparent region may correspond to a semi-transparent front display portion. The specific pattern of the arrangement of the plurality of light guides may be a stacked bundle in at least one of a raster pattern, a hexagonal pattern, and a polygonal pattern. The plurality of light guides may be arranged as a guide plate that may comprise a plurality of localized guiding regions to transfer the excitations from the plurality of pixels in the display device to the front display portion. The plurality of light guides may be arranged between the front display portion and the display portion of the display device in accordance with one of a conical arrangement or a truncated conical arrangement.

In accordance with an embodiment, the plurality of light guides may be made of plurality of optical fibers. Each light guide may comprise a core region surrounded by a clad region. The core region of each light guide may comprise a refractive index profile that may vary along a radius of a cross-section of the input portion of each light guide. The variation of the refractive index profile at the input portion may be one of a convex refractive index profile, a concave refractive index profile, and a parabolic refractive index profile. The refractive index profile may vary along a plurality of layers present in each light guide along the radius of the cross-section. The refractive index profile may vary to transfer the excitation with a uniform distribution of the excitation at the front display portion. The refractive index profile of each light guide is varied such that the excitation from the set of pixels or sub-pixels is guided along an intended path from the input portion to the output portion and displayed at the corresponding position on the front display portion.

In accordance with an embodiment, each light guide may be an optical fiber with a refractive index profile that may be a constant value along the radius of a cross-section of each light guide of the plurality of light guides. The overlay panel may further comprise a reflective mirror coating that may be present on sides or a curved surface of each light guide of the plurality of light guides. The reflective mirror coating may maintain the constant value of the refractive index profile along the radius of the cross-section of each light guide of the plurality of light guides. The excitation from the set of pixels or sub-pixels may be guided along an intended path from the input portion towards the output portion and subsequently displayed at a corresponding position on the front display portion. The excitation from the set of pixels or sub-pixels may be displayed at the corresponding position on the front display portion, based on a reflection of the excitation along a reflective surface of the reflective mirror coating.

In accordance with an embodiment, the plurality of light guides may have a cross-sectional size at the input portion and the output portion that may determine the set of pixels or sub-pixels covered by each light guide of the plurality of light guides. The cross-sectional size may be varied based on a specified range of viewing distance for the display device. In accordance with an embodiment, the cross-sectional size of the plurality of light guides may be same as that of a sub-pixel in the display device. A set of light guides may cover a single pixel on the display device to minimize a degree of misalignment between the overlay panel and the display device and maintain a display resolution above a threshold for the specified range of viewing distance.

In accordance with an embodiment, the cross-sectional size of the plurality of light guides may be same as that of a pixel in the display device. Each light guide may cover a single pixel on the display device and maintain a display resolution above a threshold for the specified range of viewing distance. In accordance with an embodiment, the cross-sectional size of the plurality of light guides may be same as that of a group of pixels in a localized region of the display device. Each light guide may cover the group of pixels in the localized region on the display device and maintain a display resolution above a threshold for the specified range of viewing distance. In accordance with an embodiment, the display device may be a multi-panel display device. The front display portion may be disposed over a cumulative surface area the multi-panel display device. The cumulative surface area may include a plurality of display portions and a plurality of bezel portions of the multi-panel display device.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments that fall within the scope of the appended claims.

What is claimed is:

1. An overlay panel for a display device, comprising:
   a front display portion arranged over a surface area of the display device, wherein the surface area includes a display portion and a bezel portion of the display device; and
   a guiding portion that comprises a plurality of light guides arranged in a specific pattern between the front display portion and the display portion of the display device, wherein
      the plurality of light guides is arranged such that an input portion of each light guide of the plurality of light guides is aligned with a set of pixels or sub-pixels of a plurality of pixels present in the display portion of the display device and an output portion of each light guide of the plurality of light guides is coupled to the front display portion,
      a cross-sectional size of each light guide of the plurality of light guides is varied based on a specified range of a viewing distance for the display device,
      the guiding portion is configured to transfer an excitation from the input portion to the output portion,
      the excitation is caused by the set of pixels or sub-pixels of the plurality of pixels,
      the front display portion is configured to display an image based on the excitation,
      the image covers the bezel portion and the display portion of the display device, and
      the image is displayed at the front display portion such that each pixel in the image is scaled by an equal scaling factor with respect to each pixel in the display portion of the display device.

2. The overlay panel according to claim 1, further comprising a support portion that comprises a plurality of side clips, wherein the plurality of side clips is configured to mount the overlay panel on the surface area of the display device.

3. The overlay panel according to claim 1, further comprising an adhesive material, wherein the overlay panel is mounted on the surface area of the display device based on an application of the adhesive material on a contact region between the display device and the overlay panel.

4. The overlay panel according to claim 3, wherein the overlay panel is mounted on the surface area of the display device using a combination of a plurality of side clips and the adhesive material.

5. The overlay panel according to claim 1, wherein
   the guiding portion has a thickness that is based on an extended length of the bezel portion above a plane of the display portion of the display device, and
   a value of the equal scaling factor is based on the thickness of the guiding portion.

6. The overlay panel according to claim 1, wherein the front display portion is at least one of:
   a transparent region,
   a frosted region,
   a combination of the frosted region in center area of the front display portion and the transparent region at edges of the front display portion, or
   a combination of the transparent region in the center area of the front display portion and the frosted region at the edges of the front display portion.

7. The overlay panel according to claim 1, wherein
   the front display portion is a partially transparent region having a defined transmittance for incident excitation from the plurality of light guides, and
   the partially transparent region corresponds to a semi-transparent front display portion.

8. The overlay panel according to claim 1, wherein the specific pattern of the arrangement of the plurality of light guides is a stacked bundle in at least one of a raster pattern, a hexagonal pattern, or a polygonal pattern.

9. The overlay panel according to claim 1, wherein
   the plurality of light guides is arranged as a guide plate that comprises a plurality of localized guiding regions, and
   the plurality of localized guiding regions is configured to transfer the excitation from the plurality of pixels in the display device to the front display portion.

10. The overlay panel according to claim 1, wherein the plurality of light guides is arranged between the front display portion and the display portion of the display device based on one of a conical arrangement or a truncated conical arrangement.

11. The overlay panel according to claim 1, wherein
    the plurality of light guides is a plurality of optical fibers,
    each light guide of the plurality of light guides comprises a core region surrounded by a clad region, and
    the core region of each light guide of the plurality of light guides comprises a refractive index profile that varies along a radius of a cross-section of the input portion of each light guide of the plurality of light guides.

12. The overlay panel according to claim 11, wherein a variation of the refractive index profile at the input portion is one of a convex refractive index profile, a concave refractive index profile, or a parabolic refractive index profile.

13. The overlay panel according to claim 11, wherein
    the refractive index profile varies along a plurality of layers in each light guide of the plurality of light guides along the radius of the cross-section, and
    the refractive index profile varies to transfer the excitation with a uniform distribution of the excitation at the front display portion.

14. The overlay panel according to claim 11, wherein the refractive index profile of each light guide of the plurality of light guides is varied such that the excitation from the set of pixels or sub-pixels is guided along an intended path from the input portion to the output portion and displayed at a corresponding position on the front display portion.

15. The overlay panel according to claim 1, wherein each light guide of the plurality of light guides is an optical fiber with a refractive index profile that is a constant value along a radius of a cross-section of each light guide of the plurality of light guides.

16. The overlay panel according to claim 15, further comprising a reflective mirror coating, wherein
    the reflective mirror coating is on sides or a curved surface of each light guide of the plurality of light guides, and
    the reflective mirror coating is configured to maintain the constant value of the refractive index profile along the radius of the cross-section of each light guide of the plurality of light guides.

17. The overlay panel according to claim 16, wherein
    the excitation from the set of pixels or sub-pixels is guided along an intended path from the input portion towards the output portion based on a reflection of the excitation along a reflective surface of the reflective mirror coating, and
    the excitation is subsequently displayed at a corresponding position on the front display portion.

18. The overlay panel according to claim 1, wherein the set of pixels or sub-pixels covered by each light guide of the plurality of light guides is determined based on the cross-sectional size of each light guide of the plurality of light guides.

19. The overlay panel according to claim 18, wherein
the cross-sectional size of each light guide of the plurality of light guides is same as that of a sub-pixel in the display device,
a set of light guides of the plurality of light guides covers a single pixel on the display device to minimize a degree of misalignment between the overlay panel and the display device, and
the plurality of light guides is configured to maintain a display resolution above a threshold for the specified range of the viewing distance.

20. The overlay panel according to claim 18, wherein
the cross-sectional size of each light guide of the plurality of light guides is same as that of a pixel in the display device,
each light guide of the plurality of light guides covers a single pixel on the display device, and
the plurality of light guides is configured to maintain a display resolution above a threshold for the specified range of the viewing distance.

21. The overlay panel according to claim 18, wherein
the cross-sectional size of each light guide of the plurality of light guides is same as that of a group of pixels in a localized region of the display device,
each light guide of the plurality of light guides covers the group of pixels in the localized region on the display device, and
the plurality of light guides is configured to maintain a display resolution above a threshold for the specified range of the viewing distance.

22. The overlay panel according to claim 1, wherein
the display device is a multi-panel display device,
the front display portion is over a cumulative surface area of the multi-panel display device, and
the cumulative surface area includes a plurality of display portions and a plurality of bezel portions of the multi-panel display device.

23. A multi-panel display device, comprising:
a plurality of display panels arranged side by side based on an arrangement pattern for the plurality of display panels; and
a plurality of overlay panels, wherein each overlay panel of the plurality of overlay panels is mounted on a display portion and a bezel portion of each display panel of the plurality of display panels, wherein
each overlay panel of the plurality of overlay panels comprises:
a front display portion arranged over the display portion and the bezel portion of a display panel of the plurality of display panels; and
a guiding portion that comprises a plurality of light guides arranged in a specific pattern between the front display portion and the display portion of the display panel, wherein
the plurality of light guides is arranged such that an input portion of each light guide of the plurality of light guides is aligned with a set of pixels or sub-pixels of a plurality of pixels present in the display portion of the display panel and an output portion of each light guide of the plurality of light guides is coupled to the front display portion,
a cross-sectional size of each light guide of the plurality of light guides is varied based on a specified range of a viewing distance for the display panel,
the guiding portion is configured to transfer an excitation from the input portion to the output portion,
the excitation is caused by the set of pixels or sub-pixels of the plurality of pixels,
the front display portion is configured to display an image based on the excitation,
the image covers the bezel portion and the display portion of the display panel, and
the image is displayed at the front display portion such that each pixel in the image is scaled by an equal scaling factor with respect to each pixel in the display portion of the display panel.

24. The multi-panel display device according to claim 23, wherein each display panel of the plurality of display panels is affixed with the front display portion and the guiding portion such that the image on the multi-panel display device is seamlessly viewable.

25. The multi-panel display device according to claim 23, wherein the image displayed at the front display portion of each overlay panel of the plurality of display panels is a fragment of a complete image to be displayed at the multi-panel display device.

26. The multi-panel display device according to claim 23, wherein the arrangement pattern is one of a flat rectangular, a flat square, or a curved arrangement pattern for the plurality of display panels.

27. A display device, comprising:
a display panel that comprises a display portion and a bezel portion; and
an overlay panel that comprises:
a front display portion arranged over a surface area of the display portion and the bezel portion; and
a guiding portion that comprises a plurality of light guides arranged in a specific pattern between the front display portion and the display portion of the display device, wherein
the plurality of light guides is arranged such that an input portion of each light guide is aligned with a set of pixels or sub-pixels of a plurality of pixels present in the display portion of the display panel and an output portion of each light guide of the plurality of light guides is coupled to the front display portion,
a cross-sectional size of each light guide of the plurality of light guides is varied based on a specified range of a viewing distance for the display device,
the guiding portion is configured to transfer an excitation from the input portion to the output portion,
the excitation is caused by the set of pixels or sub-pixels of the plurality of pixels,
the front display portion is configured to display an image based on the excitation,
the image covers the bezel portion and the display portion of the display panel, and
the image is displayed at the front display portion such that each pixel in the image is scaled by an equal scaling factor with respect to each pixel in the display portion of the display panel.

* * * * *